L. A. PECKHAM.
SHOCK ABSORBING DEVICE.
APPLICATION FILED FEB. 8, 1911.

1,009,337.

Patented Nov. 21, 1911.

WITNESSES:
Herbert L. Kelley
E. J. Ogden

INVENTOR
Luther A. Peckham
BY
Howard E. Barlow
ATTORNEY

UNITED STATES PATENT OFFICE.

LUTHER A. PECKHAM, OF EDGEWOOD, RHODE ISLAND.

SHOCK-ABSORBING DEVICE.

1,009,337.   Specification of Letters Patent.   Patented Nov. 21, 1911.

Application filed February 8, 1911. Serial No. 607,334.

*To all whom it may concern:*

Be it known that I, LUTHER A. PECKHAM, a citizen of the United States, and resident of Edgewood, in the county of Providence and State of Rhode Island, have invented certain new and useful Improvements in Shock-Absorbing Devices, of which the following is a specification.

This invention relates to attachments for vehicles for neutralizing or minimizing the effect of shocks and jars due to unevennesses in the road.

One of the objects of the invention is to provide a simple and powerful device that will present a gradually increasing frictional resistance to the downward movement of the vehicle body as the springs are depressed from their normal position and to gradually decrease the resistance as the body moves backward toward its normal position, and also to provide means whereby an excessive resistance will be exerted as the body approaches its maximum down stroke to quickly arrest further movement in that direction, and to present an excessive resistance when the body moves upward beyond its normal position to check an excessive rebound of the springs.

It is found in practice that as the vehicle body is hung on springs the unevennesses in the road cause the body to swing or sway laterally on its axles and a further object of the invention is to provide simple and effective means whereby the shock absorbing device may be connected to the relatively movable parts of the vehicle so as to permit this relative lateral movement without cramping or binding the working parts of the shock absorbing device.

Further, it is my object to provide means whereby the friction producing means may be adjusted to accommodate different vehicles which may be spaced differently between the frame and axle.

With these and other objects in view, the invention consists of certain novel features of construction, as will be more fully described and particularly pointed out in the appended claims.

Figure 1:
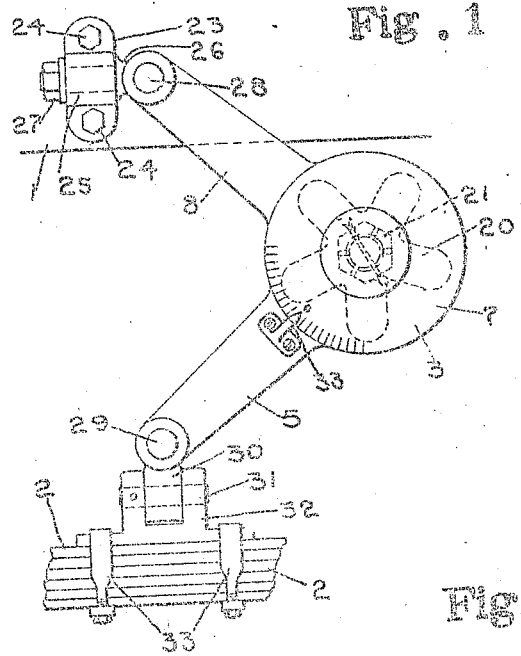
Figure 3:
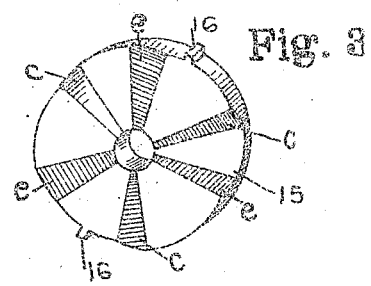
Figure 4:
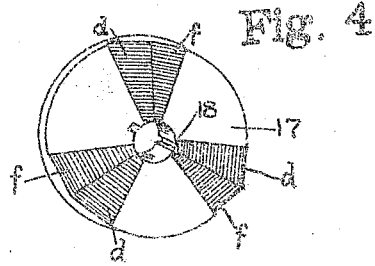
Figure 5:
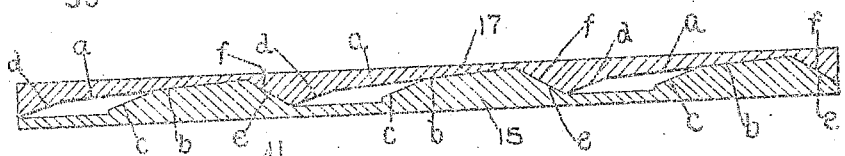
Figures 2, 6, 7, 8:
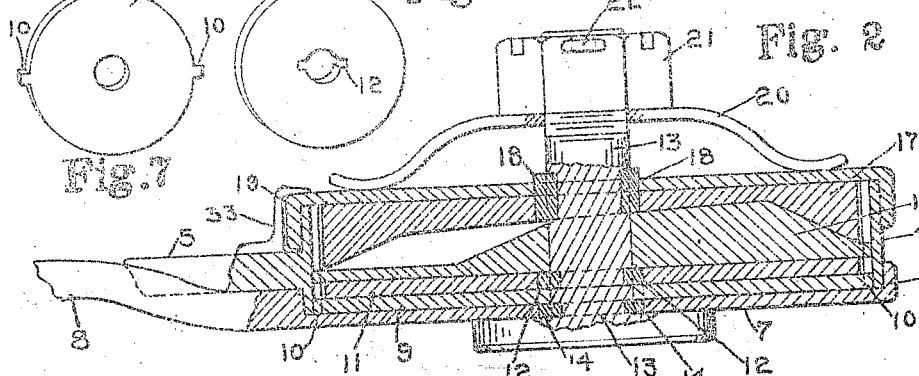

In the accompanying drawings: Figure 1— is a side elevation of my improved shock absorber the two arms of which being attached to different relatively movable parts of the vehicle. Fig. 2— is an enlarged sectional edge view through the body of my device. Fig. 3— is a perspective view showing the front engaging face of the band cam member. Fig. 4— is a perspective view showing the front engaging face of the incasing friction plate cam member. Fig. 5— is a diagrammatic view showing the arrangement of the cam faces and their relative positions under normal conditions. Fig. 6— is a small detail view of the band member showing the key ways therein. Fig. 7— shows one of the friction disks which is keyed to move with the band member. Fig. 8— is a corresponding friction disk which is keyed to move with the stud 13.

Referring to the drawings the device embodying my present invention is shown as applied to an automobile, 1- designating a portion of the frame or chassis thereof and 2 a portion of one of the springs, which latter may be secured to the axle not shown, and to the body by any suitable means.

The shock absorbing device comprising a body portion 3 is preferably made in the form of a circular drum, said drum comprising an outer band member 4 to which is secured one of the connecting arms 5. This band member is provided with a plurality of key-ways 6 by means of which the alternate friction members are held to rotate therewith, and also by means of which the cam plate 15, hereinafter described, may be adjusted and set to accommodate itself to vehicles of different distances between the body and axle. The outer inclosing friction cap plate 7 is provided with a connecting arm 8 said plate being cupped out to fit over the end and rotate on the outside of said band 4. Lying against the inner surface of this inclosing friction plate, is the friction disk 9 which is provided with projections or keys 10—10, see Fig. 7, to engage and move with the band member 4. The surface of another friction disk 11 lies against that of the disk 9, disk 11 instead of being connected to the band member, is connected at its center portion by means of keys 12 to the stud 13, which passes transversely through all of the friction members, as illustrated in Fig. 2, and to which the outer inclosing plate 7 is also secured by means of keys 14—14. The cam plate 15 lies with its back friction surface against the disk 11, the edge of said cam plate being provided with projections 16 which may engage and be set in any of the key ways 6 in the band member 4 and caused to turn with said member. An oppositely arranged cam plate 17, see Fig. 4, lies with its face against that of cam plate 15, said cam 17 being keyed as shown at 18—18 to the stud 13 to move therewith. An outer inclosing cap-shaped member 19 is arranged to set over this end of the band member and turn thereon, said plate being also secured by means of the key 18 to the stud 13 and is adapted to slide laterally on said keys as the cam members 15 and 17 turn upon each other. A spring 20 is arranged to press against this inclosing cap member 19, its tension being adjusted by the nut 21, which nut may be locked by a cotter pin 22, or other means in the desired position.

Any desired means for attaching my improved shock absorber to the relatively movable parts of a vehicle may be employed, but in practice I prefer to support the same by the two arms 5 and 8 as illustrated in Fig. 1, and to connect said arms to said vehicle parts so as to permit a relatively lateral movement of said parts without cramping or binding the working parts of the shock absorber. To accomplish this in a simple and effective manner I have provided a bracket 23 rigidly bolted at 24 to the frame, said bracket being provided with a boss 25 in which a pin 26 is loosely mounted to rotate, and is held in position by the nut 27, the opposite end of the pin is provided with an eye to which the end of arm 8 is pivoted at 28. The lower arm 5 is pivoted at 29 to a member 30 which member is adapted to rotate on the pin 31 in the bracket 32. This bracket may be held by straps 33 or any other suitable means to the springs 2. By this construction it will be seen that when the vehicle parts receive a relative lateral movement the pin 26 and the member 30 may swing on their respective axes and thereby remove any liability of cramping on the working parts of the shock absorber.

The operation of my device is more particularly described as follows: When the lugs 16 of the cam plate 15 are set in the proper notches 6 in the band 4, the faces of the cam members will be in the relative position illustrated in Fig. 5 when the body of the vehicle is without a load, at rest and in its normal position, in which case the pointer 33 in Fig. 1 will indicate zero. When the vehicle springs are slightly depressed the relatively movable parts of the vehicle approach each other, in which case the surfaces $a$ and $b$ of the cam members in the body of the shock absorber slide upon each other, part $b$ riding up on the slightly inclined surface of part $a$, thereby causing the cam plate 17 to slide outward on its keys 18—18 compressing the tension spring 20 and creating a slightly increased friction on all of the friction surfaces in the device, and when the body returns or moves back toward its normal position the friction is proportionally decreased. But when the springs approach their maximum depression the sharp incline $c$ of cam 15 engages and rides up on a corresponding inclined surface $d$ of the cam plate 17, thereby creating an excessive resistance on the frictional surfaces limiting the further depression of the springs. After an excessive compression the recoil of the springs has a tendency to move the body back beyond its normal position in which case the sharp incline $e$ of the cam member 15 rides up on the correspondingly inclined surface $f$ of the cam member 17, thereby again exerting a greatly increased friction on the frictional member and quickly checking a further movement in this direction due to an excessive rebound of the springs.

I claim:

1. In a shock absorber two relatively movable members, one of said members having a relatively long slightly inclined cam portion terminating in a higher more sharply inclined portion, the other member having an inclined surface complemental to the respective cam portions of the first member, the second member being also provided with a depression wider than the higher cam portion of the first member and receiving the same, whereby relative movement of said members effects a first or gradual frictional resistance and subsequently a rapidly increasing frictional resistance to the relative movement of said members.

2. In a shock absorber two relatively movable members, one of said members having a relatively long slightly inclined cam portion terminating in a higher more sharply inclined portion, the other member having an inclined surface complemental to the respective cam portions of the first member, the second member being also provided with a depression wider than the higher cam portion of the first member and receiving the same, whereby relative movement of said members effects a first or gradual frictional resistance and subsequently a rapidly increasing frictional resistance to the relative movement of said members, and means for effecting a relative adjustment of said members.

3. In a shock absorber two relatively movable members one of said members having a relatively long slightly inclined cam portion terminating in a higher more sharply inclined V-shaped portion, the second member also having an inclined surface complemental to the elongated cam portion of the first member, and also provided with a depression wider than said V-shaped portion and receiving the latter, the ends of said depression having inclined walls complemental to the respective faces of the V-shaped portion, whereby an excess of friction is exerted on the relatively movable members at both ends of the stroke.

4. In a shock absorber two relatively movable members one of said members having a relatively long slightly inclined cam portion terminating in a higher more sharply inclined V-shaped portion, the second member also having an inclined surface complemental to the elongated cam portion of the first member, and also provided with a depression wider than said V-shaped portion and receiving the latter, the ends of said depression having inclined walls complemental to the respective faces of the V-shaped portion, whereby an excess of friction is exerted on the relatively movable members at both ends of the stroke, and means for effecting a relative adjustment of said members.

In testimony whereof I affix my signature in presence of two witnesses.

LUTHER A. PECKHAM.

Witnesses:
HOWARD E. BARLOW,
E. I. OGDEN.